United States Patent
Arakawa

(10) Patent No.: US 6,346,578 B2
(45) Date of Patent: Feb. 12, 2002

(54) NORBORNENE BASED RESIN COMPOSITION AND PHASE DIFFERENCE PLATE

(75) Inventor: Kohei Arakawa, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/756,730

(22) Filed: Jan. 10, 2001

(30) Foreign Application Priority Data

Jan. 14, 2000 (JP) .................................. 2000-005446

(51) Int. Cl.$^7$ ............................................. C08L 45/00
(52) U.S. Cl. ................................................... 525/210
(58) Field of Search ............................................ 525/210

(56) References Cited

FOREIGN PATENT DOCUMENTS

| JP | 5-27118 | 2/1993 | |
| JP | 05-027118 | 2/1993 | * |
| JP | 05-100114 | 4/1993 | * |
| JP | 5-100114 | 4/1993 | |
| JP | 10-68816 | 3/1998 | |
| JP | 10-068816 | 3/1998 | * |
| JP | 10-090521 | 4/1998 | * |
| JP | 11-231132 | 8/1999 | * |

* cited by examiner

Primary Examiner—Terressa M. Boykin
(74) Attorney, Agent, or Firm—Burns, Doane, Swecker & Mathis, LLP

(57) ABSTRACT

A phase difference plate is provided which can be formed by a single material at a low cost without a need for forming laminated layers, and which has excellent performance in a wide band. The phase difference plate is formed by using a norbornene based resin composition which includes a norbornene based resin; and a polymer whose birefringence value is negative, and whose wavelength dispersion of birefringence values satisfies $|\Delta n(450)/\Delta n(550)| \geq 1.02$, wherein $\Delta n(450)$ and $\Delta n(550)$ are birefringence values ($\Delta n$) at a wavelength of 450 nm and a wavelength of 550 nm, respectively. The polymer is preferably a polystyrene based polymer.

20 Claims, 2 Drawing Sheets

RETARDATION WAVELENGTH DISPERSION CHARACTERISTICS

RETARDATION WAVELENGTH DISPERSION CHARACTERISTICS

NORBORNENE BASED RESIN COMPOSITION AND PHASE DIFFERENCE PLATE

BACKGROUND OF THE INVENTION

1. Field of the Invention

The present invention relates to a phase difference plate which is suitable for a reflection-type liquid crystal display device which can be used as a display device in various fields such as personal computers, AV equipment, portable information communication devices, game and simulation devices, on-board navigation systems, and the like, and to a norbornene based resin composition which is suitably used in the phase difference plate.

2. Description of the Related Art

A $\lambda/4$ plate, whose retardation (Re) is ¼ of the length of a wavelength, has various applications in reflection-type LCDs, pick-up for optical discs, anti-glare films, and the like. A $\lambda/2$ plate, whose retardation (Re) is ½ of the length of a wavelength, is useful as a liquid crystal projector. In each of these applications, it is preferable that the $\lambda/4$ plate and the $\lambda/2$ plate sufficiently exhibit functions with respect to all of the incident light in the range of visible light which can be seen by the human eye.

For example, Japanese Patent Application Laid-Open (JP-A) Nos. 5-27118, 5-100114, 10-68816 and 10-90521 have proposed, as wide band phase difference plates functioning as $\lambda/4$ plates and $\lambda/2$ plates with respect to incident light in the entire visible light region, structures in which two polymer films having respective different optical anisotropy are layered.

However, in these cases, in the production thereof, it is necessary to obtain two types of chips in which elongate films, which are each drawn in one direction, are cut in directions forming different angles with respect to the directions of drawing, and to laminate these chips together. In such a $\lambda/4$ plate, the optical anisotropy (inclination of the optical axis or the slow axis) of each polymer film is determined by the angle at which the chip is cut with respect to the direction of drawing of the drawn film. Thus, a precise cutting technology is required. Moreover, when the two chips are laminated, an adhesive must be applied and precise alignment must be carried out, such that the production processes are complex. Namely, processes such as an adhering process, a chip-forming process, a laminating process, and the like result in an increase in costs. Further, dirtying caused by the scum produced during chip-forming and the like, dispersion in the phase differences caused by errors in the laminating angle, and the like adversely affect the actual performances.

Currently, there has not yet been provided a technology in which a wide band $\lambda/4$ plate or a wide band $\lambda/2$ plate, which has retardation of ¼ wavelength or ½ wavelength in the entire region of visible light and which is sufficiently durable to be able to withstand use, is formed by a single material without forming layers.

SUMMARY OF THE INVENTION

An object of the present invention is to provide a phase difference plate which can be formed by a single material at a low cost without having to form a laminated structure, and which exhibits excellent performances in a wide band. Moreover, an object of the present invention is to provide a norbornene based resin composition which is suitably used in the phase difference plate.

The norbornene based resin composition of the present invention comprises: a norbornene based resin; and a polymer whose birefringence value is negative, and whose wavelength dispersion of birefringence values satisfies $|\Delta n(450)/\Delta n(550)| \geq 1.02$, wherein $\Delta n(450)$ and $\Delta n(550)$ are birefringence values ($\Delta n$) at a wavelength of 450 nm and a wavelength of 550 nm, respectively.

The phase difference plate of the present invention is formed by using the norbornene based resin composition of the present invention.

DESCRIPTION OF THE PREFERRED EMBODIMENTS

Norbornene Based Resin Composition

Figure 1:
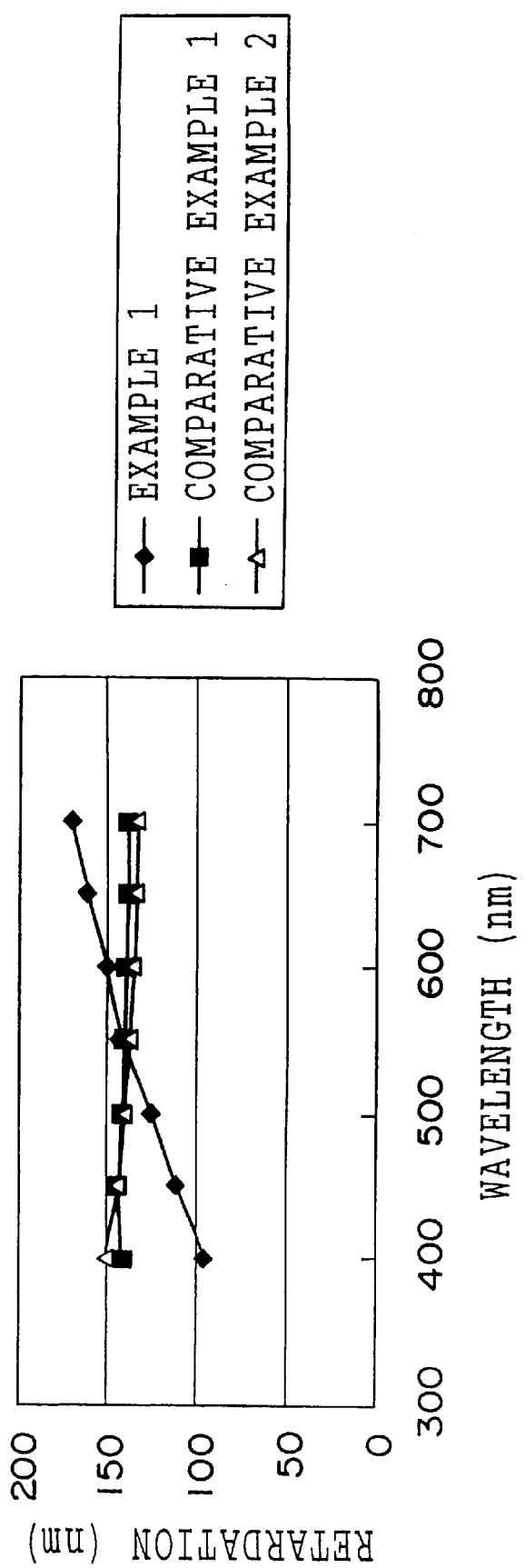
FIG. 1 is a graph showing results of measurement of wavelength dispersion characteristics of Re values in a visible light range of phase difference plates manufactured in Example 1, Comparative Example 1, and Comparative Example 2.

The norbornene based resin composition of the present invention comprises a norbornene based resin and a polymer whose birefringence value is negative, as well as other components which are appropriately selected as needed.

Norbornene Based Resin

The norbornene based resin has the characteristic of exhibiting positive optical uniaxiality when the molecules are oriented in uniaxial order.

The norbornene based resin is not particularly limited, and can be appropriately selected in accordance with the object. However, thermoplastic norbornene resins are preferable from the standpoints of excellent transparence, low water absorbency, excellent heat resistance, low photoelasticity, and their suitability to optical applications.

The thermoplastic norbornene resin has, as the repeating unit thereof, a norbornene skeleton. Specific examples thereof are disclosed in JP-A-60-168708, 62-252406, 62-252407, 2-133413, 63-145324, 63-264626, 1-240517, Japanese Patent Application Publication (JP-B) No. 57-8815, and the like. One type of thermoplastic norbornene resin may be used alone, or two or more types may be used in combination.

In the present invention, among the thermoplastic norbornene resins, those having a repeating unit expressed by any of following structural formulas (I) through (IV) are preferable.

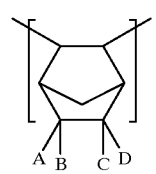

(I)

-continued

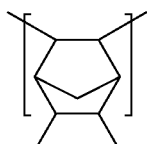
(II)

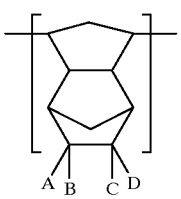
(III)

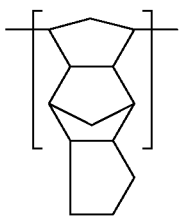
(IV)

In the above structural formulas, A, B, C and D represent a hydrogen atom or a monovalent organic group.

Among the thermoplastic norbornene resins, a hydrogen-added polymer, which is obtained by the hydrogen addition of a polymer obtained by metathesis polymerization of at least one type of tetracyclododecene expressed by following structural formula (V) and an unsaturated cyclic compound which is polymerizable therewith, is preferable.

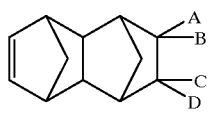
(V)

In the above structural formula, A, B, C and D represent a hydrogen atom or a monovalent organic group.

The weight average molecular weight of the norbornene based resin is around 5,000 to 1,000,000, and is preferably 8,000 to 200,000.

Polymer whose Birefringence Value is Negative

The polymer whose birefringence value is negative is a polymer in which, when the molecules thereof are oriented in order uniaxially the overall optical characteristic of the polymer exhibits negative uniaxiality.

The polymer whose birefringence value is negative may be a single polymer exhibiting such a characteristic, or a polymer having such a characteristic may be obtained by blending two or more polymers.

The polymer whose birefringence value is negative is selected from polymers in which the wavelength dispersion of the birefringence value is large. Specifically, the polymer is selected from polymers whose wavelength dispersion of the birefringence value satisfies $|\Delta n(450)/\Delta n(550)| \geq 1.02$, and preferably satisfies $|\Delta n(450)/\Delta n(550)| \geq 1.05$, wherein the birefringence values ($\Delta n$) at a wavelength of 450 nm and a wavelength of 550 nm are $\Delta n(450)$ and $\Delta n(550)$, respectively.

Further, the larger the value of $|\Delta n(450)/\Delta n(550)|$ is, the better. However, in the case of polymers, $|\Delta n(450)/\Delta n(550)|$ is usually 2.0 or less.

Examples of the polymers are polystyrene based polymers, polyacrylonitrile based polymers, polymethylmethacrylate based polymers, cellulose ester based polymers (excluding those having an birefringence value which is positive), or copolymers (binary, ternary, etc.) thereof. A single such polymer can be used alone, or two or more types of such polymers can be used in combination.

Among these, polystyrene based polymers such as polystyrene, styrene/acrylonitrile copolymers, styrene/maleic anhydride copolymers, styrene/methylmethacrylate copolymers, and the like are particularly preferable.

The mixing ratio of the polymer whose birefringence value is negative with respect to the norbornene based resin differs in accordance with the magnitudes of the absolute values of the birefringence values of both, the manifestation of birefringence at the molding temperature, and the like. Although the mixing ratio cannot be unconditionally limited, the mixing ratio is preferably a weight ratio (norbornene based resin: polymer having a negative birefringence value) of 5:5 to 9:1, and more preferably 7:3 to 8:2.

Other Components

The other components are not particularly limited, provided that they do not adversely affect the effects of the present invention, and can be selected appropriately as needed. A suitable example of such other components are compatibilizing agents.

A compatibilizing agent is suitably used in cases in which phase separation occurs when the norbornene based resin and the polymer whose birefringence value is negative are mixed together. By using a compatibilizing agent, the mixed-together state of the norbornene based resin and the birefringence value is satisfactory.

Application

The norbornene based resin composition of the present invention can be suitably used in a phase difference plate having birefringence.

Phase Difference Plate

The phase difference plate of the present invention is formed by using the norbornene based resin composition of the present invention.

It is preferable that the phase difference plate satisfies the inequality Re(450 nm) <Re (550 nm) <Re(650 nm), wherein Re(450 nm), Re(550 nm), Re(650 nm) are the retardation (Re) values at wavelengths of 450 nm, 550 nm, and 650 nm, respectively.

The phase difference plate is preferably either a wide band $\lambda/4$ plate or a wide band $\lambda/2$ plate.

The method of manufacturing the phase difference plate of the present invention is not particularly limited, and can be selected appropriately in accordance with the object. For example, the phase difference plate can be manufactured as follows. Namely, the phase difference plate can be manufactured by a solution film forming method in which the norbornene based resin composition of the present invention is made into a solution and is applied and dried so as to form a film. Or, the phase difference plate can be manufactured by an extrusion molding method in which the norbornene based resin composition of the present invention is made into pellets which are melt extruded and form a film.

Given that Re(450 nm), Re(550 nm), Re(650 nm) are the retardation (Re) values at wavelengths of 450 nm, 550 nm, and 650 nm, respectively, if the phase difference plate obtained as described above satisfies the inequality Re(450 nm)<Re (550 nm)<Re(650 nm), it can be used as it is. However, if the phase difference plate does not satisfy this inequality, it is preferable that the phase difference plate is used after the retardation (Re) values have been controlled to satisfy the above inequality, by changing the conditions such as the compositional ratio, the drawing temperature, or the like.

Preferable examples of the aforementioned drawing are longitudinal uniaxial drawing for drawing in the direction of mechanical flow, lateral uniaxial drawing (e.g., tenter drawing) for drawing in the direction orthogonal to the direction of mechanical flow, and the like. However, if there is anisotropy in the drawing, biaxial drawing may be carried out.

Application

The phase difference plate of the present invention exhibits desired characteristics with a single molded body. Thus, there is no need to laminate two or more members, and the phase difference plate can be manufactured at a low cost, and exhibits excellent performances in a wide band. The phase difference plate of the present invention is suitably used in reflective-type liquid crystal display devices which can be used as display devices in various fields such as personal computers, AV equipment, portable information communications equipment, game and simulation devices, on-board navigation systems, and the like.

Hereinafter, Examples of the present invention will be described. However, it is to be noted that the present invention is not limited to these Examples.

Example 1

A coating solution (25 wt %) was prepared by dissolving, in a methylene chloride solution, 19 parts by weight of a norbornene resin (ATON F, manufactured by JSR Co.) as the norbornene based resin, and 6 parts by weight of polystyrene (HRM-2-211L manufactured by Toyo Styrene Co.) as the material whose birefringence value is negative, and a small amount of a compatibilizing agent (a copolymer of norbornene and styrene).

The aforementioned polystyrene had a wavelength dispersion of the birefringence value of $|\Delta n(450)/\Delta n(550)|=1.05$, wherein the birefringence values ($\Delta n$) at wavelengths of 450 nm and 550 nm were $\Delta n(450)$ and $\Delta n(550)$.

The above coating solution was flowingly spread onto a glass plate by using a doctor blade and was dried so that a transparent film having a thickness of 104 $\mu$m was formed. The transparent film was 23% uniaxially extruded at 150° C. so as to obtain a phase difference plate. The wavelength dispersion of the Re values of the phase difference plate was measured by using a retardation measuring device (KOBRA21DH, manufactured by Oji Keisoku Co.). The results are shown in FIG. 1.

As can be seen in FIG. 1, the phase difference plate satisfied the inequality Re(450 nm)<Re (550 nm)<Re(650 nm), wherein Re(450 nm), Re(550 nm), Re(650 nm) are the retardation (Re) values at wavelengths of 450 nm, 550 nm, and 650 nm, respectively. The phase difference plate exhibited the characteristic of a $\lambda/4$ plate in a wide band.

Comparative Example 1

A phase difference wavelength plate was formed in the same manner as in Example 1, except that polystyrene was not used, the thickness of the transparent film was 105 $\mu$m, and the transparent film was 36% uniaxially extruded at 155° C. The wavelength dispersion of the Re values was measured in the same way as in Example 1. The results are shown in FIG. 1.

As can be seen from FIG. 1, this phase difference plate did not exhibit the characteristics of a wide band $\lambda/4$ plate.

Comparative Example 2

A phase difference wavelength plate was formed in the same manner as in Example 1, except that norbornene resin was not used, the thickness of the transparent film was 97 $\mu$m, and the transparent film was 17% uniaxially extruded at 110° C. The wavelength dispersion of the Re values was measured in the same way as in Example 1. The results are shown in FIG. 1.

As can be seen from FIG. 1, this phase difference plate did not exhibit the characteristics of a wide band $\lambda/4$ plate.

Example 2

A coating solution (25 wt %) was prepared by dissolving, in a methylene chloride solution, 19 parts by weight of a norbornene resin (ATON F, manufactured by JSR Co.) as the norbornene based resin, and 6 parts by weight of polystyrene (HRM-2-211L manufactured by Toyo Styrene Co.) as the material whose birefringence value is negative, and a small amount of a compatibilizing agent (a copolymer of norbornene and styrene).

The aforementioned polystyrene had a wavelength dispersion of the birefringence values of $|\Delta n(450)/\Delta n(550)|=0.82$, wherein the birefringence values ($\Delta n$) at wavelengths of 450 nm and 550 nm were $\Delta n(450)$ and $\Delta n(550)$.

The above coating solution was flowingly spread onto a glass plate by using a doctor blade and was dried so that a transparent film having a thickness of 210 $\mu$m was formed. The transparent film was 23% uniaxially extruded at 150° C. so as to obtain a phase difference plate. The wavelength dispersion of the Re values of the phase difference plate was measured by using a retardation measuring device (KOBRA21DH, manufactured by Oji Keisoku Co.). The results are shown in FIG. 2.

Figure 2:
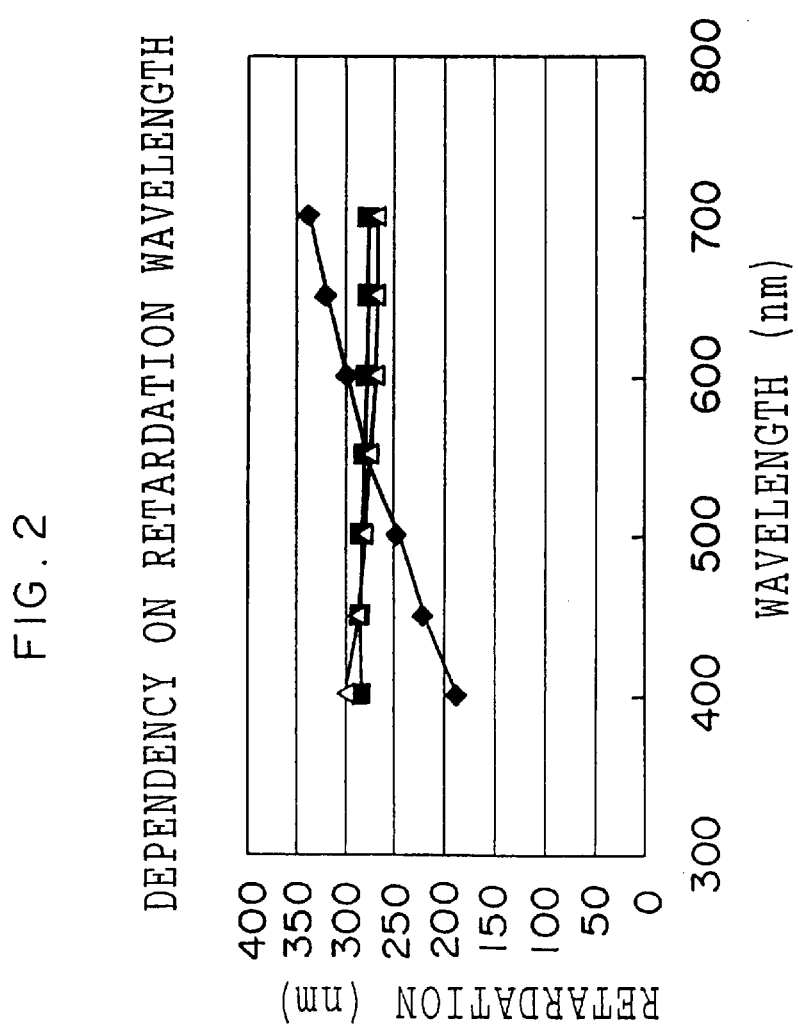
FIG. 2 is a graph showing results of measurement of wavelength dispersion characteristics of Re values in a visible light range of phase difference plates manufactured in Example 2, Comparative Example 3 and Comparative Example 4.

As can be seen in FIG. 2, the phase difference plate satisfied the inequality Re(450 nm)<Re (550 nm)<Re(650 nm), wherein Re(450 nm), Re(550 nm), and Re(650 nm) are the retardation (Re) values at wavelengths of 450 nm, 550 nm, and 650 nm, respectively. The phase difference plate exhibited the characteristic of a $\lambda/2$ plate in a wide band.

Comparative Example 3

A phase difference wavelength plate was formed in the same manner as in Example 1, except that polystyrene was not used, the thickness of the transparent film was 219 $\mu$m, and the transparent film was 35% uniaxially extruded at 155° C. The wavelength dispersion of the Re values was measured in the same way as in Example 2. The results are shown in FIG. 2.

As can be seen from FIG. 2, this phase difference plate did not exhibit the characteristics of a wide band $\lambda/2$ plate.

Comparative Example 4

A phase difference wavelength plate was formed in the same manner as in Example 2, except that norbornene resin was not used, the thickness of the transparent film was 127 $\mu$m, and the transparent film was 24% uniaxially extruded at 110° C. The wavelength dispersion of the Re values was measured in the same way as in Example 2. The results are shown in FIG. 2.

As can be seen from FIG. 2, this phase difference plate did not exhibit the characteristics of a wide band $\lambda/2$ plate

Example 3

A coating solution (25 wt %) was prepared by dissolving, in toluene, 16 parts by weight of a norbornene resin (ATON F, manufactured by JSR Co.) as the norbornene based resin, and 9 parts by weight of a styrene/maleic anhydride copolymer (DAIRAK 232, manufactured by Sekisui Kagaku Co.) as the material whose birefringence value is negative.

The aforementioned styrene/maleic anhydride copolymer had a wavelength dispersion of the birefringence value of $|\Delta n(450)/\Delta n(550)|=1.06$, wherein the birefringence values ($\Delta n$) at wavelengths of 450 nm and 550 nm were $\Delta n(450)$ and $\Delta n(550)$.

The above coating solution was flowingly spread onto a glass plate by using a doctor blade and was dried so that a transparent film having a thickness of 210 μm was formed. The transparent film was 23% uniaxially extruded at 150° C. so as to obtain a phase difference plate. The wavelength dispersion of the Re values of the phase difference plate was measured by using a retardation measuring device (KOBRA21DH, manufactured by Oji Keisoku Co.).

The results thereof were that the phase difference plate of Example 3 satisfied the inequality Re(450 nm)<Re (550 nm)<Re(650 nm), wherein Re(450 nm), Re(550 nm), Re(650 nm) are the retardation (Re) values at wavelengths of 450 nm, 550 nm, and 650 nm, respectively. The phase difference plate exhibited the characteristic of a λ/4 plate in a wide band.

The present invention provides a phase difference plate which overcomes the above-described drawbacks of the prior art, and which can be formed from a single material at a low cost without the need to form laminated layers, and which has excellent performances in a wide band. The present invention also provides a norbornene based resin composition which is suitably used in the phase difference plate.

What is claimed is:

1. A norbornene based resin composition comprising:
   a norbornene based resin; and
   a polymer whose birefringence value is negative, and whose wavelength dispersion of birefringence values satisfies $|\Delta n(450)/\Delta n(550)| \geq 1.02$, wherein $\Delta n(450)$ and $\lambda n(550)$ are birefringence values ($\Delta n$) at a wavelength of 450 nm and a wavelength of 550 nm, respectively.

2. A norbornene based resin composition according to claim 1, wherein the norbornene based resin is a thermoplastic norbornene resin.

3. A norbornene based resin composition according to claim 2, wherein the thermoplastic norbornene resin has a repeating unit expressed by any of following structural formulas (I) through (IV).

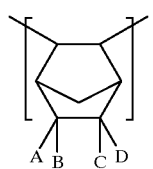
(I)

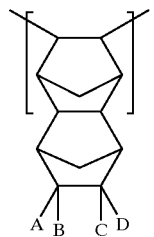
(II)

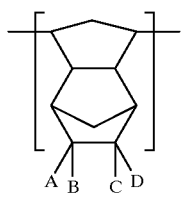
(III)

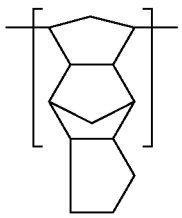
(IV)

4. A norbornene based resin composition according to claim 2, wherein the thermoplastic norbornene resin is a water-added polymer, which is obtained by the hydrogen addition of a polymer obtained by metathesis polymerization of at least one type of tetracyclododecene expressed by following structural formula (V) and an unsaturated cyclic compound which is polymerizable therewith.

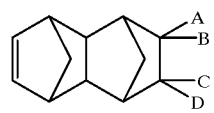
(V)

5. A norbornene based resin composition according to claim 1, wherein a weight average molecular weight of the norbornene based resin is 5,000 to 1,000,000.

6. A norbornene based resin composition according to claim 1, wherein the wavelength dispersion of birefringence values of the polymer satisfies $|\Delta n(450)/\Delta n(550)| \geq 1.05$, wherein $\Delta n(450)$ and $\Delta n(550)$ are birefringence values ($\Delta n$) at a wavelength of 450 nm and a wavelength of 550 nm, respectively.

7. A norbornene based resin composition according to claim 1, wherein the polymer is a polystyrene based polymer.

8. A norbornene based resin composition according to claim 1, wherein a weight ratio of the norbornene based resin and the polymer whose birefringence value is negative (the norbornene based resin: the polymer whose birefringence value is negative) is 5:5 to 9:1.

9. A norbornene based resin composition according to claim 1, wherein the norbornene based resin composition is used in a phase difference plate having birefringence.

10. A phase difference plate formed by using a norbornene based resin composition comprising:
    a norbornene based resin; and a polymer whose birefringence value is negative, and whose wavelength dispersion of birefringence values satisfies |Δn(450)/Δn(550)|≧1.02, wherein Δn(450) and Δn(550) are birefringence values (Δn) at a wavelength of 450 nm and a wavelength of 550 nm, respectively.

11. A phase difference plate according to claim 10, wherein the phase difference plate satisfies Re(450 nm)<Re(550 nm)<Re(650 nm), wherein Re(450 nm), Re(550 nm), and Re(650 nm) are retardation (Re) values at wavelengths of 450 nm, 550 nm, and 650 nm, respectively.

12. A phase difference plate according to claim 10, wherein the norbornene based resin is a thermoplastic norbornene resin.

13. A phase difference plate according to claim 12, wherein the thermoplastic norbornene resin has a repeating unit expressed by any of following structural formulas (I) through (IV).

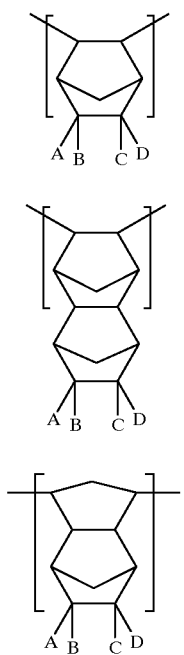

(I)

(II)

(III)

-continued

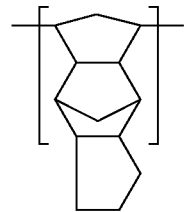

(IV)

14. A phase difference plate according to claim 12, wherein the thermoplastic norbornene resin is a water-added polymer, which is obtained by the hydrogen addition of a polymer obtained by metathesis polymerization of at least one type of tetracyclododecene expressed by following structural formula (V) and an unsaturated cyclic compound which is polymerizable therewith.

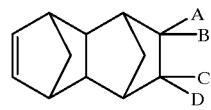

(V)

15. A phase difference plate according to claim 10, wherein a weight average molecular weight of the norbornene based resin is 5,000 to 1,000,000.

16. A phase difference plate according to claim 10, wherein the wavelength dispersion of birefringence values of the polymer satisfies |Δn(450)/Δn(550)|≧1.05, wherein Δn(450) and Δn(550) are birefringence values (Δn) at a wavelength of 450 nm and a wavelength of 550 nm, respectively.

17. A phase difference plate according to claim 10, wherein the polymer is a polystyrene based polymer.

18. A phase difference plate according to claim 10, wherein a weight ratio of the norbornene based resin and the polymer whose birefringence value is negative (the norbornene based resin: the polymer whose birefringence value is negative) is 5:5 to 9:1.

19. A phase difference plate according to claim 10, wherein the phase difference plate is one of a wide band λ/4 plate and a wide band λ/2 plate.

20. A phase difference plate according to claim 10, wherein the phase difference plate is used in a liquid crystal display device.

* * * * *